(12) United States Patent  (10) Patent No.: US 7,649,545 B2
Antonis  (45) Date of Patent: Jan. 19, 2010

(54) INSPECTION SYSTEM AND METHOD

(76) Inventor: Jan Antonis, 87 Ulsterville Gardens, Belfast BT9 7BB (IE)

( * ) Notice: Subject to any disclaimer, the term of this patent is extended or adjusted under 35 U.S.C. 154(b) by 562 days.

(21) Appl. No.: 10/822,476

(22) Filed: Apr. 12, 2004

(65) Prior Publication Data

US 2004/0252190 A1 Dec. 16, 2004

(30) Foreign Application Priority Data

Apr. 12, 2003 (GB) ................................. 0308509.9

(51) Int. Cl.
H04N 9/47 (2006.01)
H04N 7/18 (2006.01)
G06T 15/00 (2006.01)
(52) U.S. Cl. ...................... 348/92; 345/418; 345/419; 348/95
(58) Field of Classification Search ................... 348/92, 348/141
See application file for complete search history.

(56) References Cited

U.S. PATENT DOCUMENTS

| 4,693,608 | A |  | 9/1987 | Kitagawa et al. ............. 356/394 |
| 4,899,061 | A |  | 2/1990 | Van Hoek et al. ........... 250/560 |
| 5,095,204 | A | * | 3/1992 | Novini .................... 250/223 B |
| 5,136,373 | A | * | 8/1992 | Kamiya et al. ................ 348/92 |
| 5,495,429 | A | * | 2/1996 | Craven et al. ............... 702/127 |
| 5,671,343 | A | * | 9/1997 | Kondo et al. ................ 345/419 |
| 5,974,169 | A | * | 10/1999 | Bachelder .................. 382/151 |
| 6,064,759 | A | * | 5/2000 | Buckley et al. ............. 382/154 |
| 6,072,900 | A | * | 6/2000 | Chiu et al. .................. 382/149 |
| 6,172,748 | B1 | * | 1/2001 | Sones et al. ............... 356/237.1 |
| 6,278,798 | B1 | * | 8/2001 | Rao .......................... 382/154 |

(Continued)

FOREIGN PATENT DOCUMENTS

EP 1154227 11/2001

(Continued)

OTHER PUBLICATIONS

European Search Report for EP 04 00 8677 mailed Aug. 6, 2004.

Primary Examiner—Andy S. Rao
Assistant Examiner—Jessica Roberts
(74) Attorney, Agent, or Firm—Van Dyke, Gardner, Linn & Burkhart, LLP

(57) ABSTRACT

A system for inspecting an object, the system comprising a camera; a work surface for receiving the object; and an apparatus for processing an image of the object taken by the camera wherein, during the capture of an image by the camera, the camera and the object are fixed with respect to one another. The processing apparatus identifies those image data components that represent the an edge of the object in an image plane, and projects each image edge data component onto the object plane. The processing apparatus also determines whether each object edge data component relates to an edge of the object that lies on the work surface or to an edge of the object that is spaced apart from the work surface and, upon determining that an object edge data component is spaced apart from the work surface, adjusts the value of the object edge data component by an amount depending on the ratio of the size of the object in a direction generally perpendicular with the work surface to the perpendicular distance of the camera's focal point from the object plane.

17 Claims, 11 Drawing Sheets

U.S. PATENT DOCUMENTS

| | | | |
|---|---|---|---|
| 6,571,196 B2 * | 5/2003 | Kosuge | 702/167 |
| 6,718,048 B1 * | 4/2004 | Kawata et al. | 382/103 |
| 6,868,354 B2 * | 3/2005 | Kosuge et al. | 702/94 |
| 7,003,161 B2 * | 2/2006 | Tessadro | 382/199 |
| 7,117,047 B1 * | 10/2006 | Blake et al. | 700/56 |
| 2002/0172422 A1 * | 11/2002 | Nishiwaki | 382/177 |
| 2004/0195507 A1 * | 10/2004 | Yamaguchi et al. | 250/310 |
| 2005/0151841 A1 * | 7/2005 | Nelson et al. | 348/82 |
| 2005/0259863 A1 * | 11/2005 | Freifeld | 382/152 |

FOREIGN PATENT DOCUMENTS

| | | |
|---|---|---|
| WO | WO 9115731 | 10/1991 |
| WO | WO 0002007 | 1/2000 |

\* cited by examiner

INSPECTION SYSTEM AND METHOD

FIELD OF THE INVENTION

The present invention relates to the field of object inspection and image processing.

BACKGROUND OF THE INVENTION

There are a wide variety of applications which call for the inspection of objects to determine or verify their dimensions. For example, during or after the manufacture of an object it may be necessary to verify the object's dimensions for quality control purposes. Alternatively, it may be desired to determine an object's dimensions for reverse engineering purposes.

Automatic inspection systems which employ digital cameras are well known, especially for inspecting generally planar objects such as sheet metal or printed circuit boards.

The image data captured by a digital camera is created by projecting light in 3D onto a 2D sensor. A common way to resolve this information back into 3D data is to capture images from multiple view points. Multiple viewpoints can be achieved using multiple cameras, or by moving a single camera with a precision positioning device.

Alternatively some systems employ specialised optical equipment such as a telecentric lens or a line scan camera, to constrain the system so that 3D measurement data can be resolved from a single image.

One problem with conventional inspection systems of the type outlined above is that they are expensive. As a result, in many applications inspection is still performed manually using calipers or rulers.

It would be desirable, therefore to provide an inspection system which does not require multiple cameras, relative movement between the object and the camera, or specialized optical equipment

SUMMARY OF THE INVENTION

Accordingly, as first aspect of the invention provides a system for inspecting an object, the system comprising a work surface providing an object plane on which, in use, the object to be inspected is located; and a camera arranged with respect to the work surface so that at least part of the work surface is within the camera's field of vision, the camera being arranged to capture an image of the object, the image comprising a plurality of image data components, the system further including an apparatus for processing the object image, the apparatus being arranged to receive the object image from the camera and to identify a plurality of said image data components that represent the position of a respective edge component of the object in an image plane, wherein, during the capture of an image by the camera, the camera and the object are fixed with respect to one another, the processing apparatus being arranged to project each image edge data component onto the object plane to produce a respective object edge data component in the object plane, the processing apparatus being further arranged to determine whether each object edge data component relates to an edge of the object that lies on the work surface or to an edge of the object that is offset from the work surface and, upon determining that an object edge data component is offset from the work surface, to adjust the value of the object edge data component by an amount depending on the ratio of the size of the offset in a direction generally perpendicular with the work surface to the perpendicular distance of the camera's focal point from the object plane.

In preferred embodiments, the object plane, and therefore the work surface, is substantially perpendicular to the camera's optical axis. It is also preferred that the object is positioned on the work surface such the camera's optical axis intersects with the object when the image is captured. The processing apparatus may use parameters including, the thickness of the object (in a direction generally perpendicular with the object plane), the distance of the camera's focal point above the object plane (in a direction generally perpendicular with the object plane) and/or data concerning the shape of the edge profile of the object. The processing apparatus may be arranged to receive some or all of this information by user input, and/or from local, or otherwise accessible, memory. Advantageously, the camera comprises a non-telecentric lens.

In a preferred embodiment, the processing apparatus determines whether each object edge data component relates to an edge of the object that lies on the work surface or to an edge of the object that is spaced apart, or offset, from the work surface and the amount of the offset. In one embodiment, this is achieved by calculating a respective first parameter relating to a notional reference line extending from the object edge data component, calculating a second parameter relating to a notional line extending between the object data component and a reference point in the object plane, and comparing the difference between said first parameter and said second parameter against a threshold value.

Preferably, said notional reference line extending from the object data component comprises a line which is normal, or substantially normal, to the detected edge of which the object data component forms part. Conveniently, the apparatus calculates said first parameter from a respective one or more other object data components which lie on each side of the object data component on the detected edge.

Where the reference point comprises the position of the camera's focal point, the notional reference line extending between the object data component and said reference point is referred to herein as the radial line. In the preferred embodiment, wherein said first parameter comprises the value of said angle of said normal line and said second parameter comprises the value of said angle of said radial line, said threshold value is 90 degrees. Preferably, the apparatus is arranged to determine that the object data component relates to a top edge (i.e. spaced from the work surface) if the absolute difference between said first and second parameters is greater than 90 degrees and that the object data component relates to a bottom edge (i.e. on the work surface) if the absolute difference between said first and second parameters is less than 90 degrees.

In particularly preferred embodiments, the processing apparatus is arranged to calculate a line of sight from the camera's focal point to the object edge data component and to determine the point at which the line of sight substantially meets the object edge, and to determine the amount of the offset depending on the location of said point.

Other preferred features of the invention are recited in the dependent claims.

A second aspect of the invention provides an apparatus for processing an image, as recited in Claim 9.

A third aspect of the invention provides a method of processing an object image as claimed in Claim 10.

A fourth aspect of the invention provides a computer program product comprising computer usable code for causing a computer to perform the method of Claim 10.

The invention in all its aspects is particularly suited for use with image data components corresponding to a respective point, or component, on an edge of the object. Preferably, the image data components are derived from a silhouette, or occluding contour, of the object and correspond with one or more detected edges of the object.

Further, the invention in all its aspects is particularly suited for inspecting generally planar objects such as, sheet metal, PCBs, cloth, cardboard, sheet plastics, or any other generally flat opaque objects, especially those that are punched or profiled.

Other advantageous aspects of the invention will become apparent to those skilled in the art upon review of the following description of a specific embodiment and with reference to the accompanying drawings.

BRIEF DESCRIPTION OF THE DRAWINGS

A specific embodiment of the invention is now described by way of example and with reference to the accompanying drawings in which.

DETAILED DESCRIPTION OF THE DRAWINGS

In the following description, a conventional XYZ reference co-ordinate system is adopted, where the X, Y and Z axes are mutually orthogonal.

Figure 1:
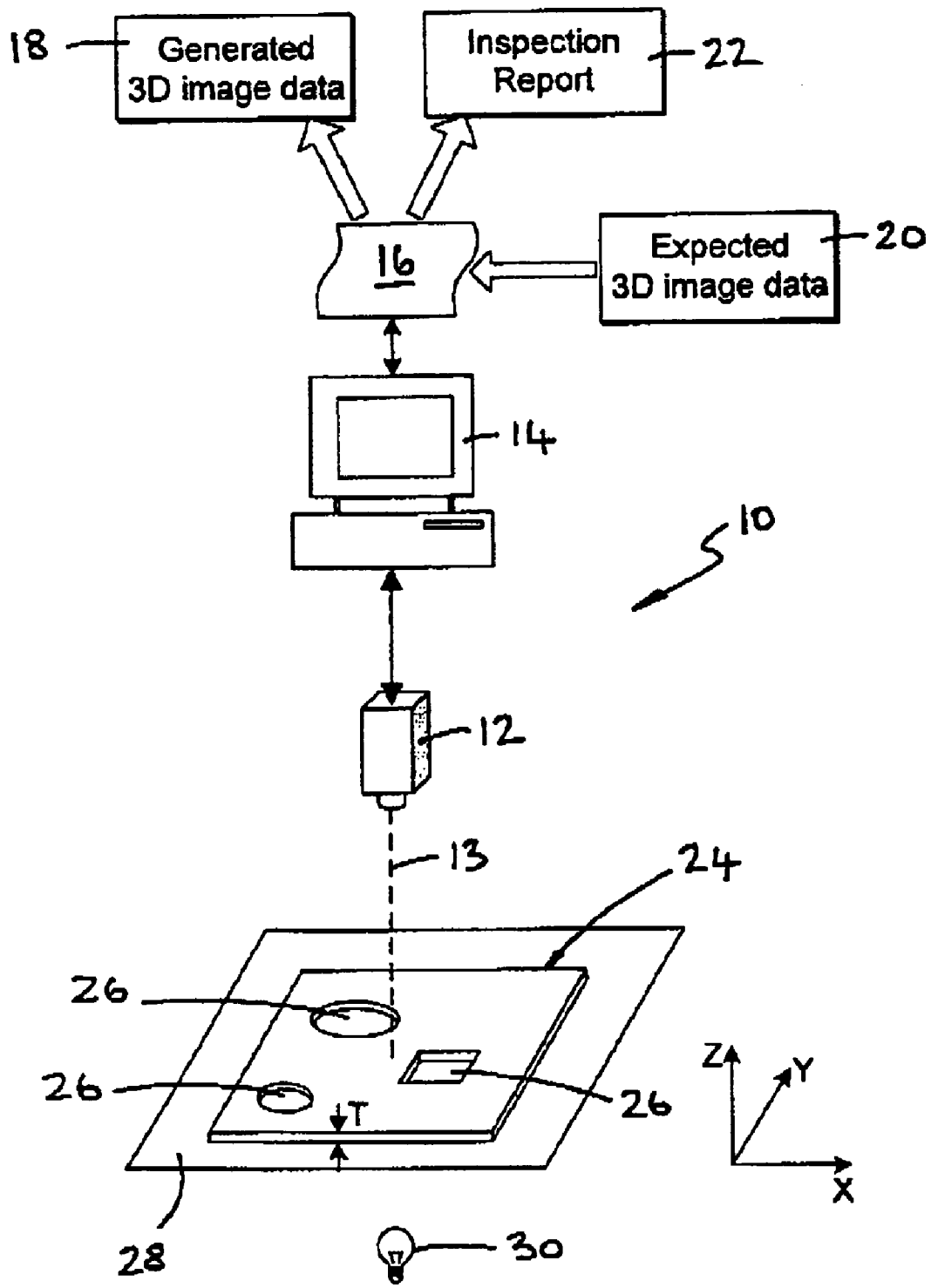
FIG. 1 is a schematic diagram of an inspection system embodying one aspect of the invention, the system being located in situ above an object to be inspected.

Referring now to FIG. 1 of the drawings, there is shown, generally indicated as 10, an example of an inspection system or apparatus embodying the invention. The apparatus 10 comprises a digital camera 12 and a data processing system 14 (which is conveniently represented as a computer in FIG. 1). The digital camera 12 is advantageously a high resolution camera wherein the resolution is in the order of at least 6 Megapixels. It will be understood that, in practice, the level of resolution required depends on the required accuracy of the results and/or on the size of the area to be inspected. The camera 12 preferably comprises a non-telecentric lens and is preferably of the area-based or stills type as opposed to, say, a line scanning camera. As a result, captured images are processed using perspective projection of points in the image plane onto the object plane, rather than using parallel projection.

The data processing system 14 is arranged to run a data processing apparatus or module 16 in the form of, for example, a computer program. As is described in more detail below, the data processing module 16 is arranged to receive image data from the camera 12 and to generate 3D data 18 representing the inspected object. Depending on the requirements of the application, the generated 3D data 18 may be compared with expected 3D data 20 to produce an inspection report 22.

FIG. 1 also shows an object 24 to be inspected. Preferably, the object 24 has a plurality of apertures 26 formed therein is preferably assumed to be generally planar, or flat, and. In particular, it is preferred that the object 24 is of generally uniform thickness T, thickness being the dimension in the Z axis (as hereinafter defined) and, in the preferred embodiment, in a direction substantially parallel with the normal line of sight of the camera 12. The object 24 may be formed from any substantially opaque material such as metal, plastics, wood, cardboard or paper. It will be understood that the specific size and shape of the illustrated object 24, and the number, size, shape and arrangement of apertures 26, is by way of example only.

The object 24 is located on the obverse face a work surface 28. In the preferred embodiment, the work surface 28 is illuminated from its reverse face by a light source 30. The work surface 28 is therefore formed from a translucent material and, more preferably, a material that diffuses light so that a substantially uniform illumination of the work surface 28 is achieved. By way of example, the work surface 28 may advantageously be formed from diffuse frosted glass, or the like.

The camera 12 is located over the work surface 28 such that any object placed on the obverse face of the work surface 28 is within its field of vision. The camera 12 has a focal point (not shown in FIG. 1) and a normal line of sight 13 (or optical axis), the normal line of sight being the line of sight from the focal point which is perpendicular to the camera's image plane. Preferably, the camera 12 is arranged with respect to the work surface so that the normal line of sight 13 of the camera 12 is substantially perpendicular to the work surface 28. While an image is being taken, the camera 12 is fixed with respect to the work surface 28 and may be held in a suitable fixed position by any suitable means, for example a gantry or other support structure (not shown). Moreover, while an image is being taken, the object 24 is fixed with respect to the work surface 28 and therefore with respect to the camera 12.

The illuminated work surface 28 causes a silhouette, or occluding contour, of the object 24 to be presented to the camera 12 and so facilitates detection of the object's perimeters or edges. It is not essential to illuminate the work surface 28. For example, providing the work surface 28 and the object 24 in respective contrasting colours or shades, the camera 12 can detect the outline, or edges, of the object 24 using conventional colour separation techniques. The contrasted outline of the object 24 against the work surface 28, whether by silhouette or colour contrast, may be referred to as an occluding contour.

During use, the camera 12 captures an image of the object 24, the image data normally comprising a plurality of image data components in the form of pixels. Hence, the camera 12 is able to provide, to the data processing module 16, image data usually in the form of an electronic file, preferably of a lossless format such as a bitmap, or the like. It is not possible to generate 3D data, or a 3D model, of the object 24 using only a single image from a single static camera 12. This is primarily because an image point can only define the start and the direction of the line of sight between that image point and the object point that created it—it cannot define the length of the line of sight and hence the position of the object point that created it. The captured image data is essentially 2D data, for example, the position of a given pixel of the image data in a plane substantially perpendicular to the camera's normal line of sight 13 (hereinafter the X-Y plane) can be determined, but its position in a plane substantially parallel to the camera's normal line of sight 13 (hereinafter the Z axis or plane) cannot be determined. As can be seen from FIG. 1, it is conveniently assumed that the work surface 28 lies substantially in an X-Y plane and the camera's normal line of sight 13 lies in a Z plane (on or parallel with the Z axis).

It may therefore be said that the position and orientation of the camera 12 and the orientation of the object 24 in a common co-ordinate system (XYZ system) are known by the data processing module 16. So too is the position and orientation of the work surface 28 (or object plane). For example, the position of the camera's focal point in the XYZ co-ordinate system is known by the module 16. In the preferred embodiment, the data processing module 16 is programmed to assume that the work surface 28 is generally perpendicularly disposed with respect to the camera's normal line of sight 13 (lying generally in an X-Y plane) and is at a known, fixed distance from the camera 12 (e.g. from the camera's focal point) along the normal line of sight 13 (known Z-axis co-ordinate, e.g. Z=0). In the preferred embodiment, the object 24 (especially when the object 24 is assumed to be generally planar) or at least its, in use upper surface, is generally perpendicularly disposed with respect to the camera's optical axis 13. It is also preferred that the data processing module 16 is programmed to assume that the camera's optical axis 13 passes near the object 24 (i.e. that the object 24 is in the camera's field of view and is positioned generally over the object 24 rather than significantly to the side of the object 24). The camera's optical axis 13 may intersect with the object 24 (i.e. the camera 12 is positioned over the object 24 rather than to the side of the object 24). In the preferred embodiment, the inspection system 10 is arranged so that these assumptions are correct.

To address the problem outlined above, it is preferred, but not essential, that the inspection apparatus 10, and in particular the data processing module 16, is arranged for use with objects that are generally planar, of known thickness and which, during use, lie substantially in an X-Y plane.

The data processing module 16 is also provided with, or pre-programmed with, data indicating the shape of the transverse cross-sectional profile of the object 24 in both the Z-Y plane and the Z-X plane. By way of example, the object 24 may have either a right-sided profile (FIGS. 1 and 5), a beveled profile (FIGS. 6, 9 and 10) or an undercut profile (FIG. 7). If the profile is beveled or undercut, then the data processing module 16 is supplied with data indicating either the angle of the bevel or undercut (in the Z-Y or Z-X plane as appropriate and hereinafter referred to as the object edge angle (OEA)), or the width of the bevel or undercut (in the X or Y direction as appropriate). This information may be used in conjunction with the known thickness T, as is described in more detail below.

Figure 11:
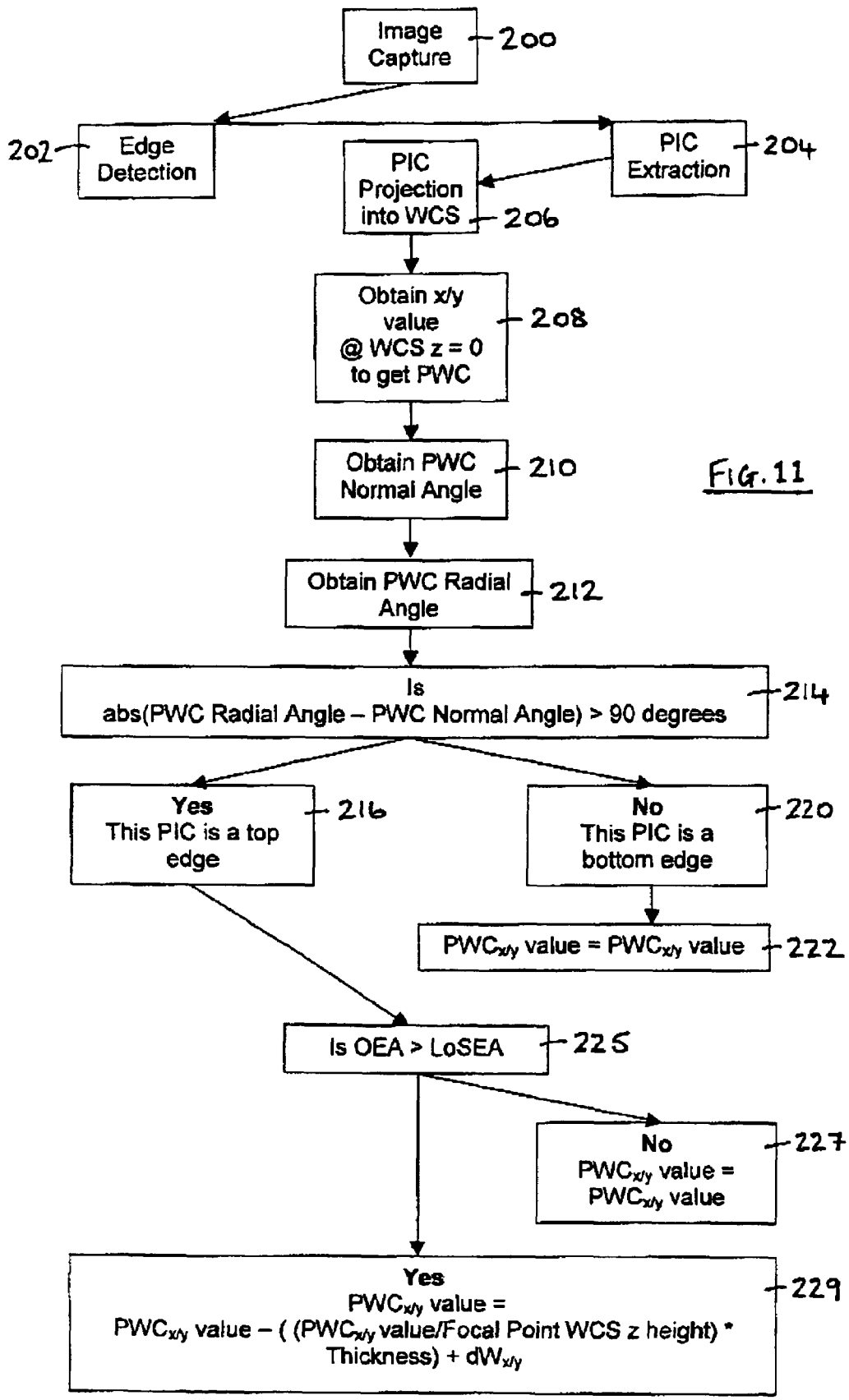
FIG. 11 is a flow chart illustrating a second example of the operation of the data processing module included in the system of FIG. 1.

The data processing module 16 may be arranged to receive some or all of the above-identified data (and other data as described hereinafter) as one or more input parameters (supplied, for example, by a user during use and/or retrievable from a local, or otherwise available, memory) and/or may be pre-programmed with some or all of the parameters or data (e.g. some or all of the data or parameters may be intrinsic to the processing algorithm(s) carried out by data processing module 16). For example, in the algorithm illustrated in FIG. 2, it is inherent that the object 24 being inspected is assumed to be right sided and that the object 24 is perpendicularly disposed with respect to the camera's optical axis 13, while the value of T may be provided by user input in respect of each object or each batch of objects of the same thickness. In the algorithm of FIG. 11, it is inherent that the object 124 being inspected has a beveled edge profile while the value of T and, for example, the bevel angle may be provided as input parameters. In alternative embodiments (not illustrated) the algorithms of FIGS. 2 and/or 11 and/or 12 may be combined to accommodate objects 24, 124, 224 which may be right-sided, beveled or undercut. In such embodiments, the data processing module 16 may receive a further input parameter, the value of which indicates whether the current object, or batch of objects, under inspection is right-sided, beveled or undercut, and the composite algorithm (not illustrated) will execute accordingly.

Hence, the data processing module 16 knows the dimension of the object 24 in the Z direction (i.e. its thickness T), together with the relevant profile data and the known relative position and orientation of the object 24 and camera 12. This information, in conjunction with the 2D image captured by the camera 12, enables the data processing module 16 to accord a 3D position (i.e. an X, Y and Z co-ordinate) to any given pixel, as is described in more detail below.

However, there is a further problem to be addressed. As is well known, the edges or perimeters of an object can be determined from the captured image data using conventional edge detection or colour separation techniques. However, for 3D objects, it is not possible to determine from a single image alone whether a detected edge is an upper edge or a lower edge. This ambiguity prevents the generation of an accurate 3D model of the object. In some circumstances, determination of an upper or lower edge can be deduced in a relatively straightforward manner. For example, in cases where the object 24 is generally perpendicular to, and is intersected by the camera's optical axis 13, and where the object is known to be right-sided, then the data processing module 16 may assume that the detected external edges are upper edges. In other circumstances, this determination is more difficult.

Figure 2:
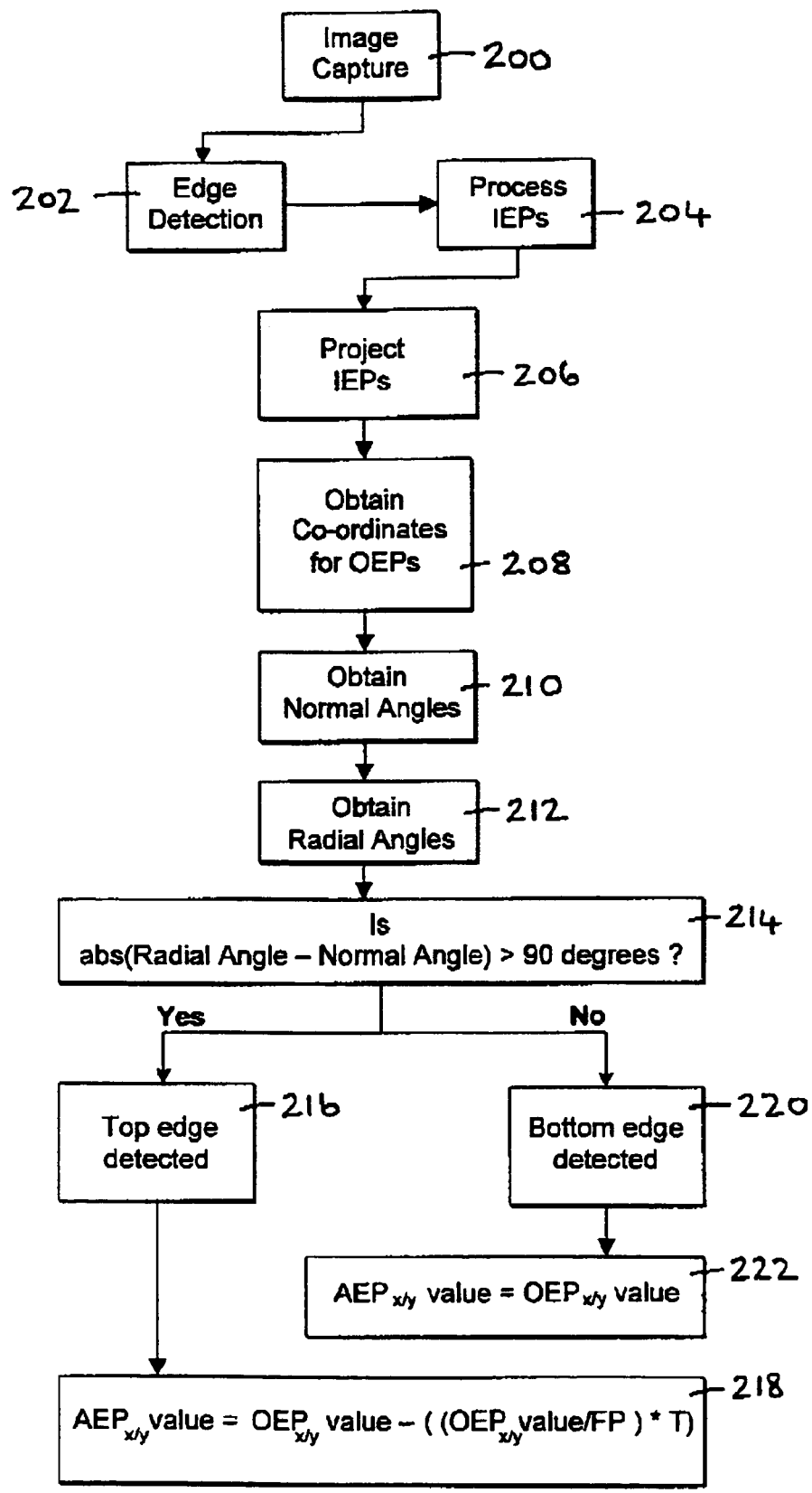
FIG. 2 is a flow chart illustrating a first example of the operation of a data processing module included in the system of FIG. 1.

The data processing module 16 is arranged to overcome this problem as described below with reference, in particular, to FIG. 2 of the drawings. FIG. 2, illustrates the processes performed by the data processing module 16. Block 200 represents receipt by the data processing module 16 of the captured image data from the camera 12. It is assumed in the present example that the image data is comprised of pixels. The captured image data comprises a representation of the 2D silhouette, or occluding contour, of the object 24 as viewed by the camera 12.

At block 202, the data processing module 16 employs conventional edge detection, or equivalent, techniques to detect the edges of the occluding contour of the captured image. In the present example, it is assumed that this is performed with single pixel accuracy (i.e. the presence of an edge is identified by the nearest whole pixel to the detected edge) although, depending on the level of accuracy required, it may alternatively be performed with sub-pixel or multi-pixel accuracy. In any event, once edge detection is completed, a plurality of 2D co-ordinate points (hereinafter referred to as image edge points IEPs) are identified which correspond to the detected edges of the occluded contour of the captured image. Where edge detection is performed with single pixel accuracy, each edge point IEP corresponds with a respective pixel of the captured image.

There are many suitable conventional edge detection techniques. The paper entitled "A Computational Approach to Edge Detection" by J. Canny in IEEE transactions on Pattern Analysis and Machine Intelligence, Volume 8, Issue 6, pp. 679-698 (ISSN: 0162-8828) describes a suitable edge detection technique.

Referring now to block 204, in the preferred embodiment, after edge detection, the image edge points (IEPs) are sorted into sets or groups according to which perimeter of the occluding contour they belong (for example, the perimeter corresponding to the exterior of the object 24 or the perimeter corresponding to one or other of the internal apertures 26). Further, within each set, the edge points IEP are preferably arranged in order, or sequence, such that successive edge points with a respective set trace, or track, the respective perimeter (i.e. the edge points within a set are ordered so that they are adjacent their nearest neighbour(s) on the respective perimeter).

There are many conventional nearest neighbour algorithms which could be used to sort the edge points in the manner described. For example, a paper (which is hereby incorporated herein by way of reference) entitled "Topological Structural Analysis of Digital Binary Images by Border Following" by S. Suzuki and K. Abe in CVGIP, volume 30, n.1 1985, pp. 32-46, describes an example of a suitable technique.

It will be understood that the processes described for blocks 202 and 204 need not necessarily be performed separately. Some edge detection techniques automatically generate edge points which are ordered in the manner described above.

At this stage, the image edge point IEP co-ordinates relate to the image plane (not illustrated), or image co-ordinate system, of the camera 12. At block 206, however, the edge points IEP in the image plane are projected to the object plane, or World co-ordinate system, i.e. the reference plane in which the inspected object 24 lies, using conventional geometrical techniques and a knowledge of the camera's intrinsic parameters (such as focal length and lens distortion) and extrinsic parameters (such as position and orientation with respect to the object plane). A description of how this process may be performed may be obtained from a paper (which is hereby incorporated herein by way of reference) entitled "A versatile camera calibration technique for high-accuracy 3D machine vision metrology using off-the-shelf TV cameras and lenses" by R. Y. Tsai published in the IEEE Journal of Robotics and Automation, Volume RA-3, No. 4, August 1987, pages 323-344.

In the present example, the object plane is assumed to correspond with the Z=0 plane, i.e. the X-Y plane, in which the work surface 28 lies. Essentially, the edge points IEP in the camera's image plane are converted into projection angles, or lines of sight, from the image plane, through the camera's focal point, and onto the object plane.

Referring now to block 208, the respective points at which the projected lines of sight intersect the Z=0 plane (hereinafter referred to as object edge points OEPs) may be represented by respective 2D co-ordinates in the Z=0 plane. The OEPs together trace, or track, a 2D outline on the Z=0 plane of the image captured by the camera 12. Depending on the shape and configuration of the inspected object, there may be one or more sets of OEPs, each set relating to a respective interior or exterior perimeter of the inspected object. For example, for the object 24, there are four sets of OEPs, one set for the exterior perimeter and three respective sets for each of the apertures 26. The tasks represented by blocks 206 and 208 may be performed simultaneously.

However, it is not possible to determine from the OEPs alone whether a given OEP relates to an upper or lower edge of the inspected object. In the preferred embodiment, to address this problem, the or each set of OEPs is assumed to define a respective polyline. For each OEP, the data processing module 16 is arranged to calculate one or more respective parameters relating to, or defining, the respective normal line (or other reference line, e.g. tangent) to the polyline at each OEP (FIG. 2, block 210). In the preferred embodiment, this is achieved by calculating a respective parameter in the form of the value of the respective angle between a reference axis and the respective normal. In order to make consistent calculations, a reference system must be established. It is therefore assumed, by way of example, that the reference axis from which angles in the X-Y plane are measured comprises, or is parallel with, the X-axis, and that angles are measured in an anti-clockwise direction from the reference axis. It is also assumed, by way of example, that the normal to the polyline at any given OEP extends inwardly of the object 24, 24' (i.e. inwardly of the polyline if the polyline represents an exterior perimeter, and outwardly of the polyline if the polyline represents an interior perimeter).

Figure 3:
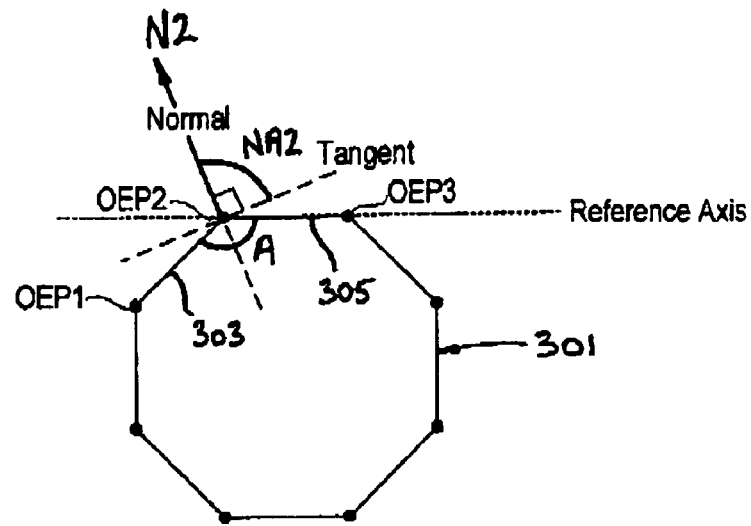
FIG. 3 is an illustration of a polyline comprised of a plurality of object edge points.

There are many suitable conventional methods for calculating normals and/or parameters that are indicative thereof. For example, with reference to FIG. 3, there is shown an example of a polyline 301 defined by a plurality of OEPs. The normal of a given point OEP2 may be assumed to comprise a line which bisects the angle A formed between the respective sections 303, 305 of polyline 301 which join the point OEP2 to its nearest neighbours OEP1, OEP3 on either side. Since the respective 2D co-ordinates (in the X-Y plane) OEP1, OEP2 and OEP3 are known, angle A may readily be calculated. In the preferred embodiment, the normal N2 at OEP2 is represented by parameter NA2 which is the angle between the reference axis and the normal N2. Assuming that the normal N2 bisects angle A, then angle NA2=180−(A/2). It is noted that in FIG. 3 polyline 301 is assumed to represent an interior perimeter and, accordingly, the normal N2 is taken as extending outwardly of the polyline 301. If, alternatively, the polyline 301 was assumed to represent an exterior perimeter, then the normal N2 would extend inwardly of the polyline 301 and angle NA2=360−A.

It will be understood that there are alternative methods of determining the normal line/normal angle (or other reference edge/reference angle) other than by constructing polylines. For example, edge detection masks, such as the Sobel edge detection system or the Canny edge detection system (referenced hereinbefore) may be employed.

It will be appreciated that, when calculating the respective angles between the reference axis and the normals (hereinafter referred to as "normal angles"), the data processing module 16 needs to know if the respective OEP being processed belongs to an interior perimeter or an exterior perimeter. This may conveniently be determined during or after the tasks described in relation to block 204. Some edge detection and/or data sorting algorithms (blocks 202, 204) determine automatically whether a set of edge points relate to an interior or exterior perimeter. This is, in any event, simple to deduce by comparing the respective edge point values in each set.

Figure 5:
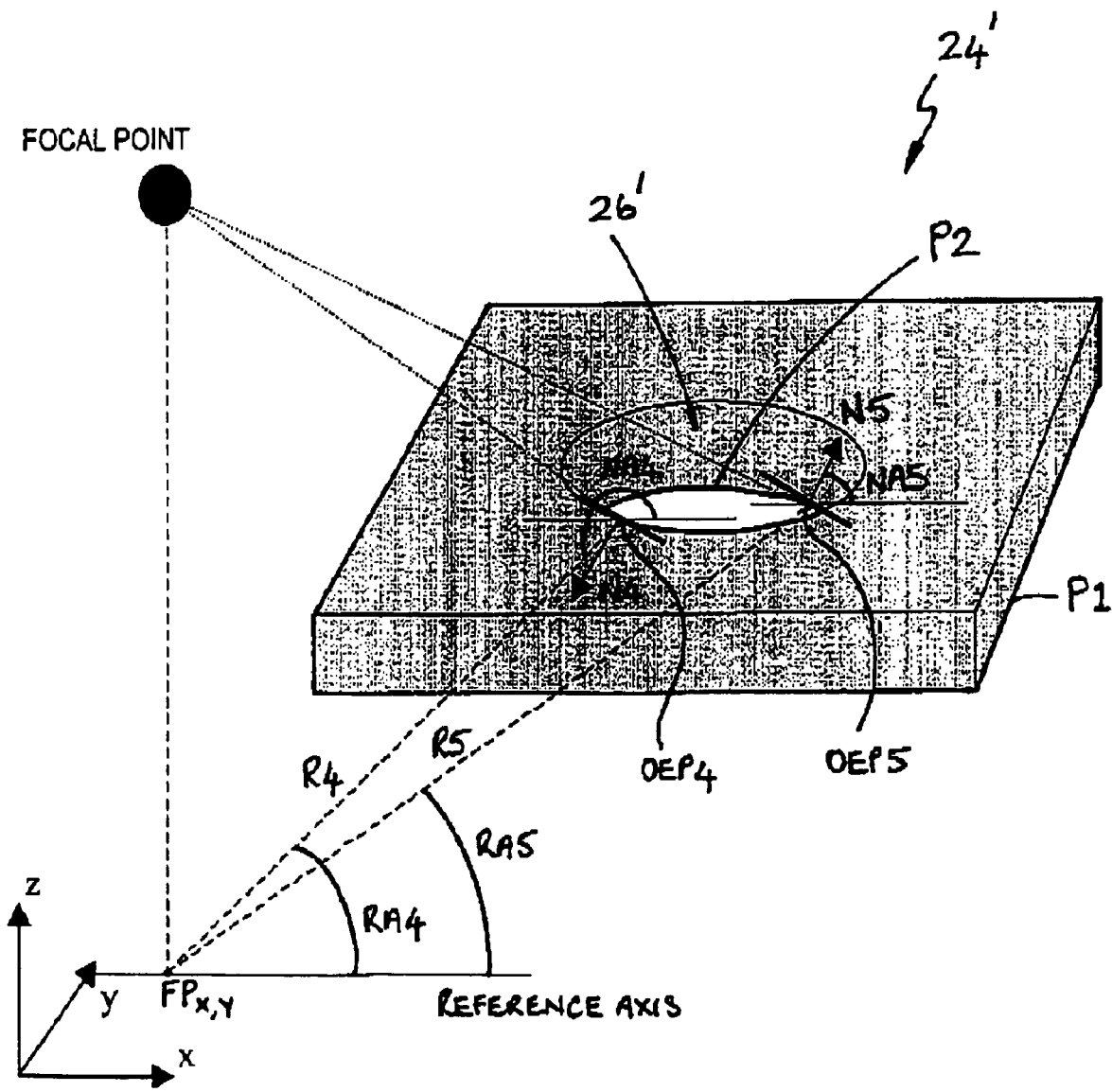
FIG. 5 is an illustration of how to determine an actual edge point from a projected edge point.

The data processing module 16 further calculates the respective position of each OEP with respect to a point $FP_{x,y}$ which is the projection of the camera's focal point onto the Z=0 plane along a line which is perpendicular to the Z=0 plane, i.e. a projection of the camera's focal point perpendicularly onto the Z=0 plane. For embodiments where the camera's line of sight 13 is substantially perpendicular to the object plane, $FP_{x,y}$ corresponds with the point at which the camera's normal line of sight 13 intersects the Z=0 plane. This is illustrated in FIG. 5. In alternative embodiments (not illustrated) where the camera's optical axis 13 is inclined with respect to the object plane, $FP_{x,y}$ does not lie on the camera's line of sight 13.

In FIG. 5, there is shown a simplified object 24' under inspection. The object 24' has an aperture 26' formed therein. After block 208 (FIG. 2), the object 24' is represented by two sets of OEPs, one set corresponding to the exterior perimeter of the object 24' (represented in FIG. 5 as emboldened polyline P1), the other set corresponding to an interior perimeter (represented in FIG. 5 as emboldened polyline P2) representing aperture 26'. For illustration purposes, two OEPS, namely OEP4 and OEP5 on interior polyline P2 are highlighted, the former being from the top edge of aperture 26', the latter being from the bottom edge aperture 26' (the relative terms "top" and "bottom" being taken with respect to the Z=0 plane and wherein increasing height is indicated by an increase in the value of the Z co-ordinate). The respective normals N4, N5 for OEP4 and OEP5 are shown extending outwardly from the polyline P2. The projected focal point of the camera 13 onto the Z=0 plane is shown as FP The data processing module 16 notionally constructs a respective radial line R4, R5 (or a representation thereof) extending between the projected focal point $FP_{x,y}$ and OEP4, OEP5 respectively. In respect of each radial line R4, R5, the data processing module 16 calculates (block 212) a respective angle RA4, RA5 between the reference axis and the radial line (hereinafter referred to as the radial angle). The radial angles are readily calculated from the known 2D co-ordinates (in the X-Y plane) of the projected focal point $F_{x,y}$ and the respective OEP.

Then, at block 214, the data processing module 16 compares the respective normal angle NA4, NA5 with the respective radial angle RA4, RA5. If the absolute difference between respective normal and radial angles is less than 90 degrees (as is the case for RA5 and NA5) then the data processing module 16 determines that the OEP relates to a bottom edge (block 220). If the absolute difference between respective normal and radial angles is greater than 90 degrees (as is the case for RA4, NA4) then the data processing module 16 determines that the OEP relates to a top edge (block 216). If the angle is deemed to be equal to 90 degrees, then an assumption can be made that the OEP relates to either the top edge or the bottom edge, as desired.

If an OEP is identified as belonging to a bottom edge, then a corresponding 3D point for creating a 3D model of the object 24, 24' is created having the same X and Y co-ordinates as the respective OEP and with Z=0 as the third dimension (block 222).

Figure 4:
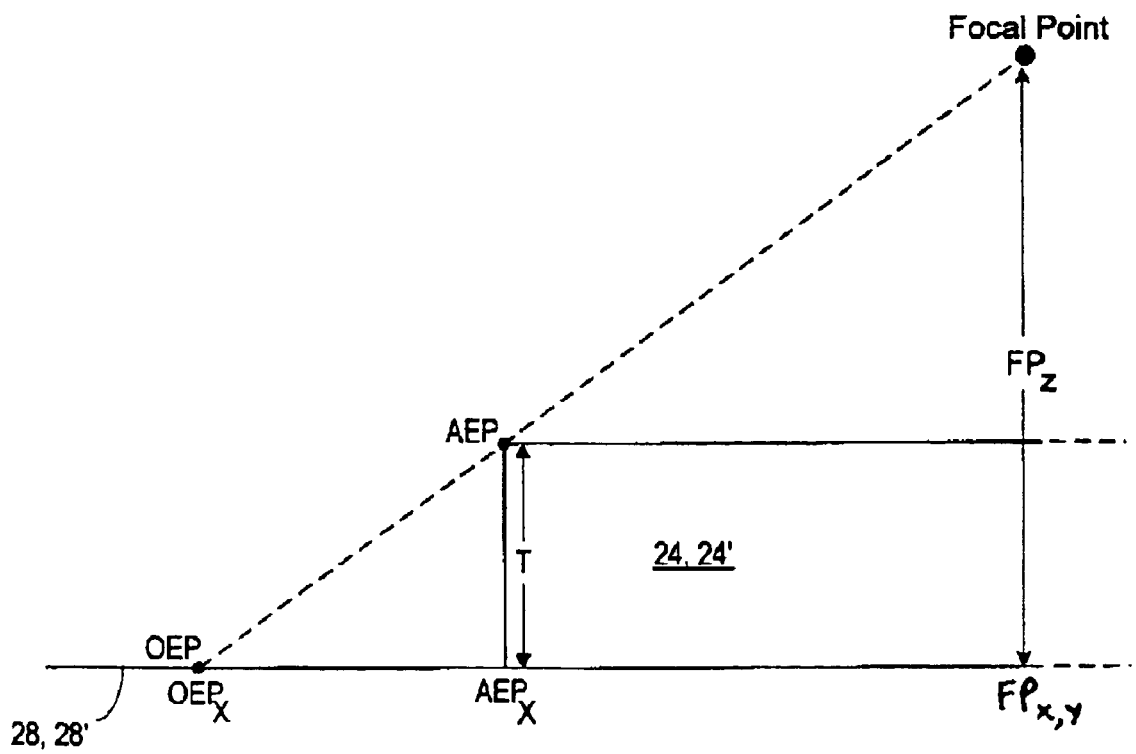
FIG. 4 is an illustration of edge examination of an inspected object.

If an OEP is identified as belonging to a top edge, then conventional mathematics may be employed to calculate a corresponding 3D point for creating a 3D model of the object 24, 24'. This will become apparent upon consideration of FIG. 4. FIG. 4 shows an object 24, 24' located on a work surface 28, 28'. It is desired to calculate the position in 3D of the actual edge point AEP of the object 24, 24'. The line of sight LOS from the camera's focal point is shown in dashed outline. The X and Y co-ordinates ($OEP_X$, $OEP_Y$) of the corresponding OEP are known, so too is the height $FP_Z$ of the focal point. The thickness T of the object 24, 24' is also known. Hence, the X and Y co-ordinates of the actual edge point AEP ($AEP_X$, $AEP_Y$) can be calculated using simple geometry and so the 3D position of the actual edge point AEP can be determined (block 218). For example, in FIG. 4, the X co-ordinate $AEP_X$ may be calculated using the equation $$AEP_X = OEP_X - ((OEP_X/FP_Z)*T)$$

The Y co-ordinate $AEP_Y$ may be calculated by substituting the $OEP_Y$ value instead of $OEP_X$ into the above equation. The Z co-ordinate $AEP_Z$ of the actual edge point AEP is equal to the thickness T of the object 24, 24'. In the above equation, it is assumed that the focal point's position in the X-Y plane, $F_{x,y}$, is the point of reference from which the $OEP_x$ and $OEP_y$ values are measured. i.e. the $OEP_x$ and $OEP_y$ values are relative to $F_{x,y}$.

The operations described with reference to blocks 206 to 218 or 222 may be repeated for each OEP as is necessary.

Hence, a 3D real world co-ordinate can be calculated for each OEP on a detected perimeter using only the data captured from a single image of the object 24, 24'. These 3D co-ordinates may be used to build up a 3D model of the object 24, 24'. If desired, or where necessary, conventional data fitting techniques may be used to deduce the true shape of the object 24, 24' or parts, e.g. apertures, thereof from the detected perimeters.

It will be apparent that the techniques described above may be applied to any edge point at which the thickness of the object 24, 24' is known. This does not necessarily imply that the object under inspection is of generally uniform thickness.

In the foregoing description, it is assumed for illustrative purposes only that the object 24, 24' under inspection is right-sided, i.e. that the sides of the object 24, 24' are substantially perpendicular with its faces and therefore, in the present example, lie in a plane that is substantially perpendicular to the X-Y plane. The invention may equally be used with objects (not shown) that are not right-sided. This is now illustrated by way of example with reference to FIGS. 6 to 12.

In the following description referring to FIGS. 6 to 12, the acronym ICS refers to the image co-ordinate system (with includes the image plane of the camera) and points in the ICS (including points in the image plane, e.g. IEPs) are referred to as PICs. The acronym WCS refers to the world co-ordinate system, i.e. the real world XYZ co-ordinate system in which, in the present example, the object plane corresponds with the Z=0 plane. Points in the WCS system (which include points in the object plane, e.g. OEPs) are referred to as PWCs.

Figure 6:
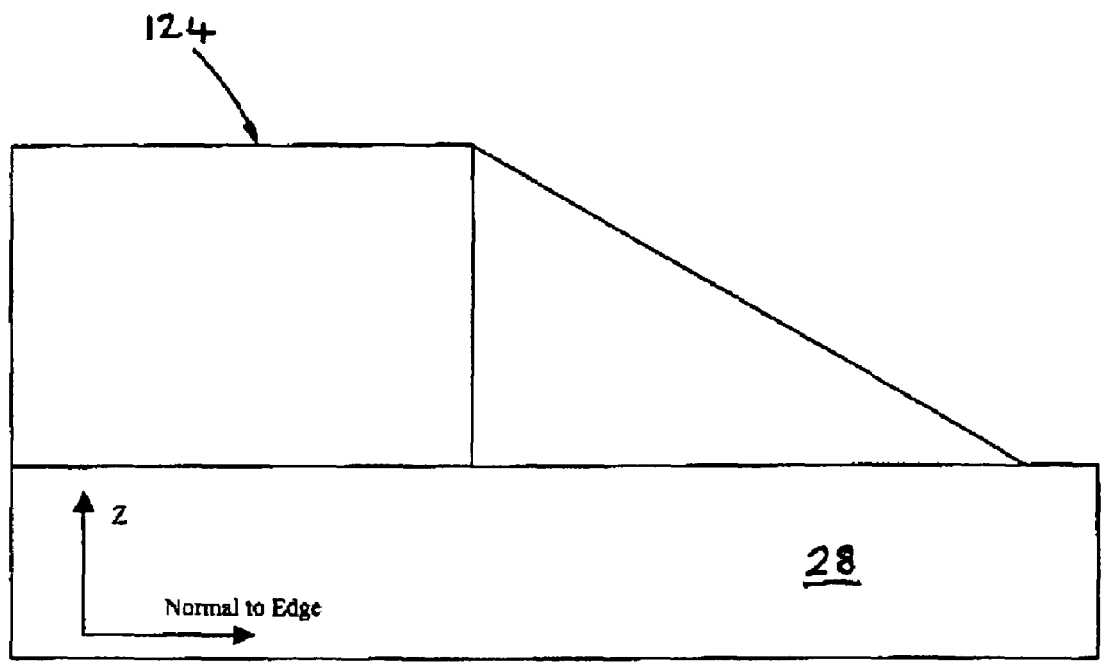
FIG. 6 presents a side sectional view of an object with a beveled edge.
Figure 7:
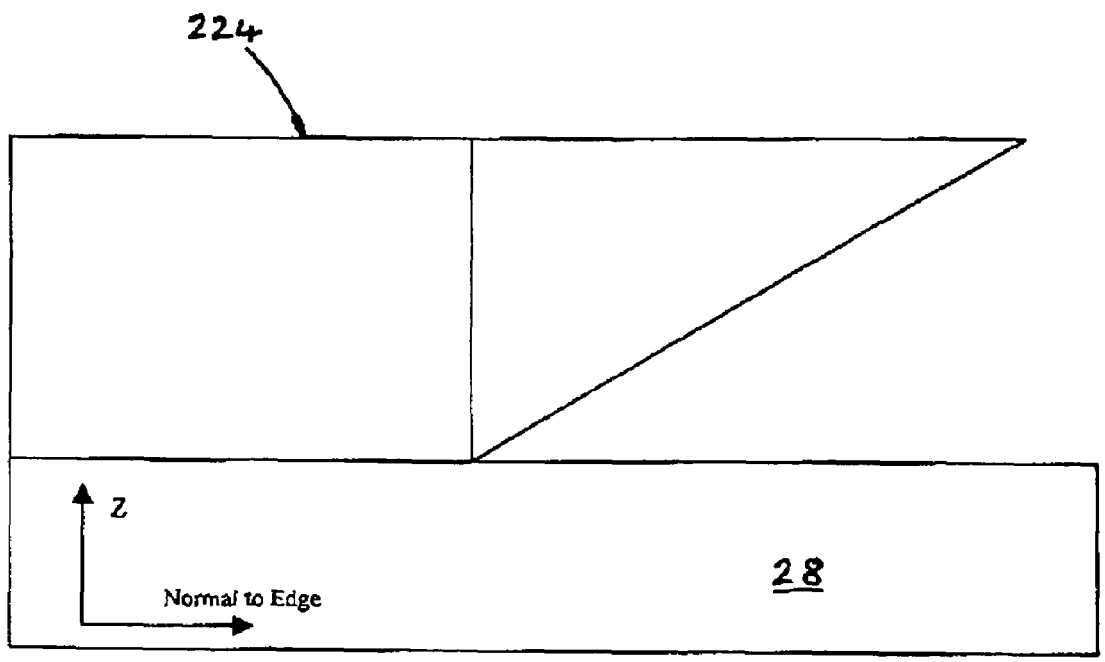
FIG. 7 presents a side sectional view of an object with an undercut edge.

FIGS. 6 and 7 show the edges of objects 124, 224 illustrating two basic types of edge profile that a typical object under inspection may have, namely a beveled edge (FIG. 6) or an undercut edge (FIG. 7). In FIGS. 6 and 7, the objects 124, 224 are shown in transverse cross-section taken in the X-Z or Y-Z planes. It will be seen that the edge profiles are generally triangular in transverse cross-section. The edge profiles may occur on external, or outer, edges of the object 124, 224 and/or on internal, or inner, edges (e.g. at an aperture 26).

Figure 8:
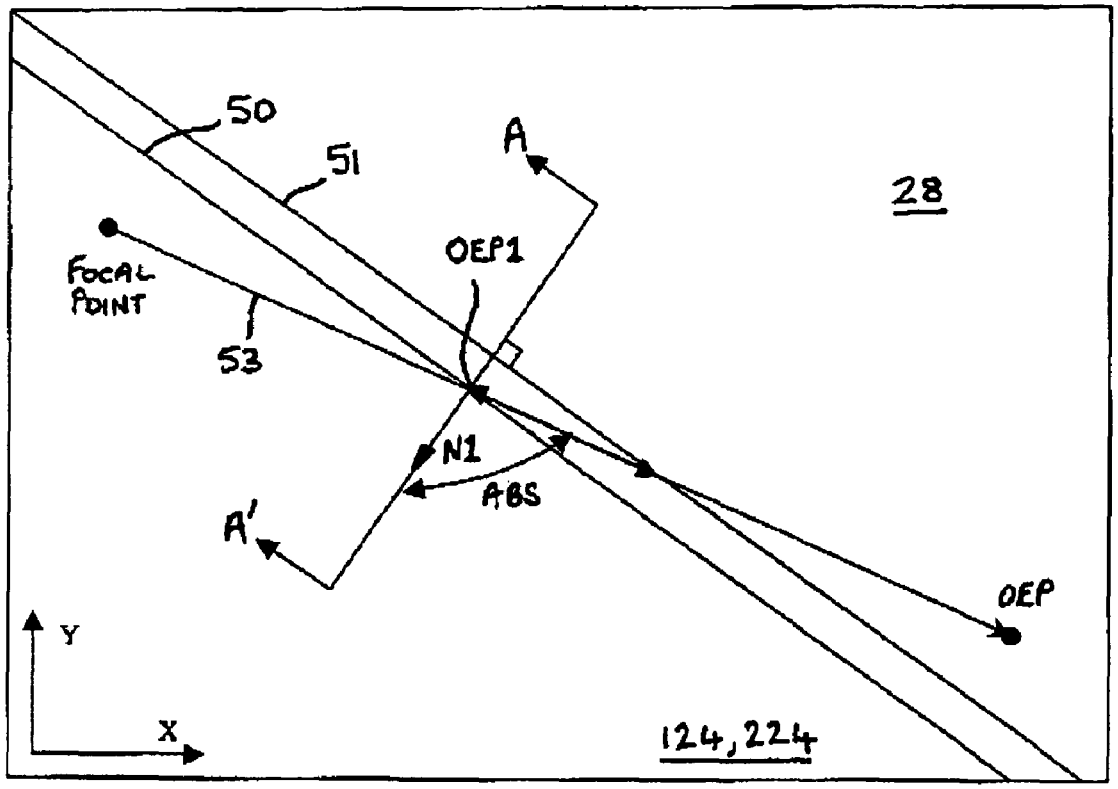
FIG. 8 presents a plan view of an edge of an object to be inspected.

FIG. 8 shows a plan view of one or other of the objects 124, 224. The top and the bottom (with respect to the work surface 28) edges are indicated as 50, 51. The edges 50, 51 are assumed to be parallel with one another. A line of sight 53 is projected from the focal point to a detected edge point OEP1. Point OEP1 has X and Y co-ordinates $PWC_x$, $PWC_y$ (collectively referred to as $PWC_{x/y}$) which, initially, take respective values as detected by the camera 12 and projected onto the object plane. The normal line N1 at the point OEP1 is also shown. The absolute difference between the line of sight angle (i.e. the radial angle as described above, hereinafter the PWC radial angle) and normal angle N1 (PWC normal angle) is greater than 90 degrees (shown as angle ABS in FIG. 8). Therefore the point OEP1 is assumed to be on the top, or upper, edge 50. Parameters $dW_x$ and $dW_y$ (collectively referred to as $dW_{x/y}$) are, respectively, the x and y distances (in the X-Y plane) from the top edge 50 to the bottom of the edge 51 along the line of sight 53.

Figure 9:
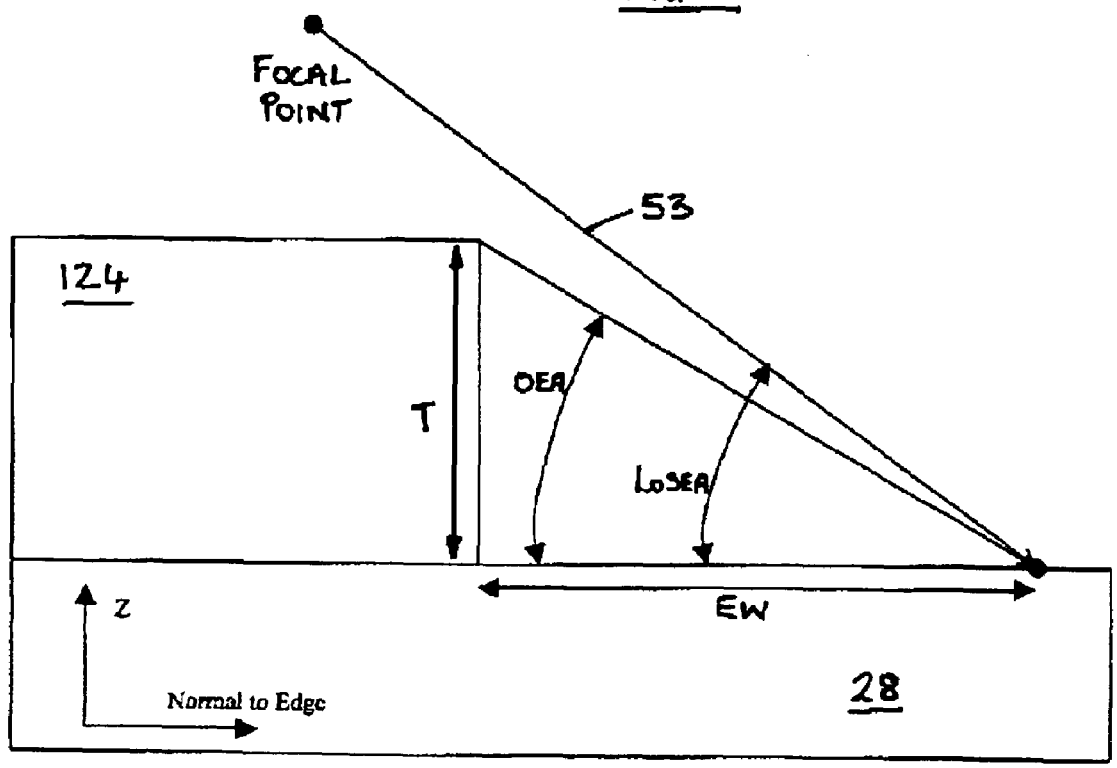
FIG. 9 presents a side sectional view of an object with a beveled edge and the camera focal point.

A cross-section normal line A-A' to the edges 50, 51 is also shown in FIG. 8. FIG. 9 shows a cross-sectional view (about the Z-axis) of the object 124 taken along line A-A'. This shows the transverse cross-sectional profile of the object taken in the plane normal to OEP1.

In FIG. 9, the object edge angle (OEA) is the angle of the bevel (conveniently with respect to the object plane or work surface 28) in the plane normal to OEP1 and the edge width (EW) is the width of the bevel in said plane. Assuming that the data processing module 16 is provided with the thickness T, then it is also provided with at least one of the object edge and the object edge width. As long as two of these parameters are known by the data processing module 16, then the third parameter can be calculated by the module 16.

The next angle required by the data processing module 16 is the Line of Sight Angle (LoSEA). The LoSEA is the angle between the line of sight 53 and the same reference (e.g. to the object plane or work surface 28) from which the OEA is measured. The LoSEA is measured in the same plane as the OEA. Preferably this is the plane normal to the OEP (OEP1 in this case) which is defined by the calculated normal angle (N1). The projection of the focal point onto the X-Y plane, $F_{x/y}$, the PWC Normal Angle, the $PWC_{x/y}$ values, and the PWC Radial Angle, are all known by the data processing module 16 (either by user input, pre programming or calculation). The value of the LoSEA may readily be calculated using only some of these parameters, e.g. $F_{x/y}$ and the appropriate $PWC_{x/y}$ value.

If, as shown in FIG. 9, the OEA is less than the LoSEA, the data processing module 16 asserts that the edge point OEP1 is on the lower edge 51 of the object 124, thereby overruling the previous assertion that it was on the top edge 50. Hence, the actual, or final $PWC_{x/y}$ values of OEP1 are the same as the detected, or initial values:

Final $PWC_{x/y}$ value=Initial $PWC_{x/y}$ value

Figure 10:
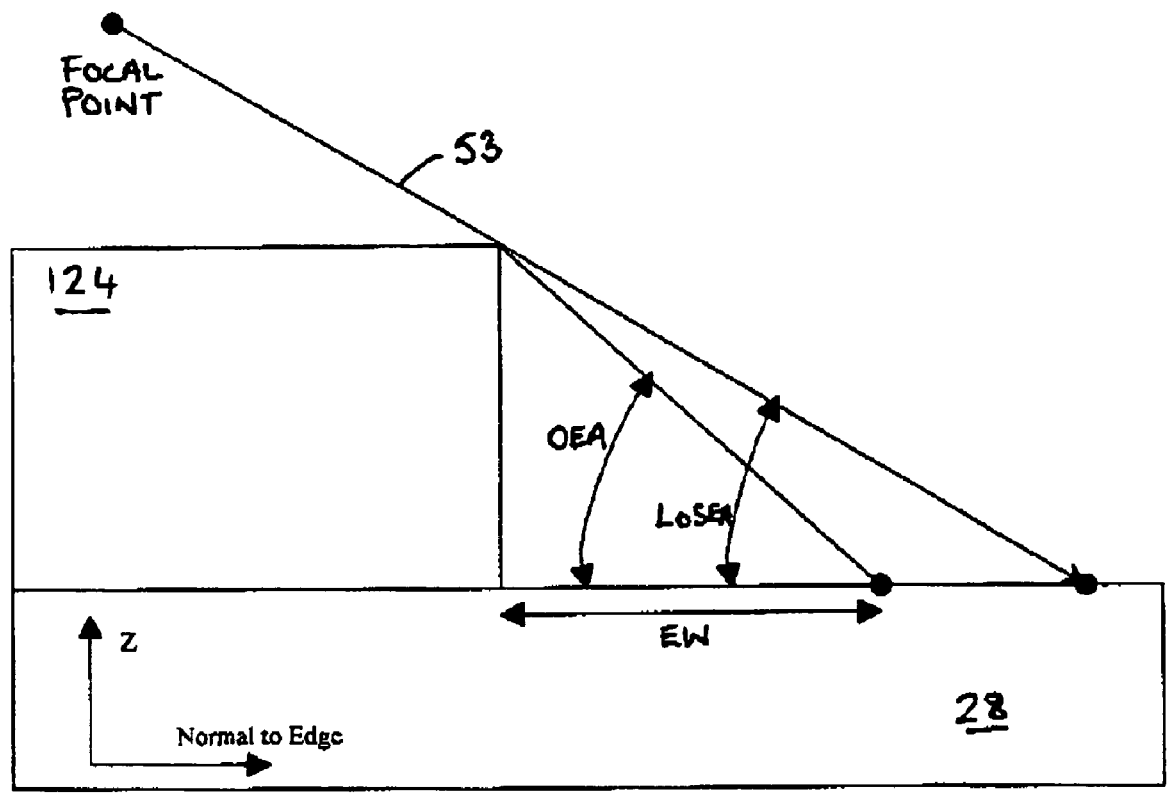
FIG. 10 presents a side sectional view of another object with a beveled edge and the camera focal point.

If the OEA is greater than the LoSEA, as shown in FIG. 10, the data processing module 16 asserts that OEP1 is from the top edge 50, and the respective PWCx/y values must be adjusted, conveniently as follows:

$PWC_{x/y}$ value=$PWC_{x/y}$ value−(($PWC_{x/y}$ value/Focal Point WCS z height)*Thickness)+$dW_{x/y}$ Where Focal Point WCS z height is the Z co-ordinate of the focal point. Parameter $F_{x/y}$, the PWC Normal Angle, the $PWC_{x/y}$ value, and the PWC Radial Angle, are all are known by the data processing module 16. Only some of these values are needed to calculate values for $dW_{x/y}$. The same process may be repeated for as many OEPs as necessary.

FIG. 11 shows a flow chart illustrating how the data processing module 16 may perform the calculations described above. It will be noted that the illustrated algorithm is the same as the algorithm illustrated in FIG. 2 until the point where it is determined that the PIC, or OEP, is a top edge (block 216). The addition decision making and calculation process described above is illustrated in additional blocks 225, 227 and 229.

The algorithm illustrated in FIG. 11 can easily be adapted to handle undercut edge profiles (FIG. 7). In such cases, the minimum edge position is the edge position which is of interest. For example, when considering a circular aperture 26 which is either beveled or undercut, the maximum diameter of a notional cylinder (not shown) which can fit through the aperture 26 is the measurement of interest.

Figure 12:
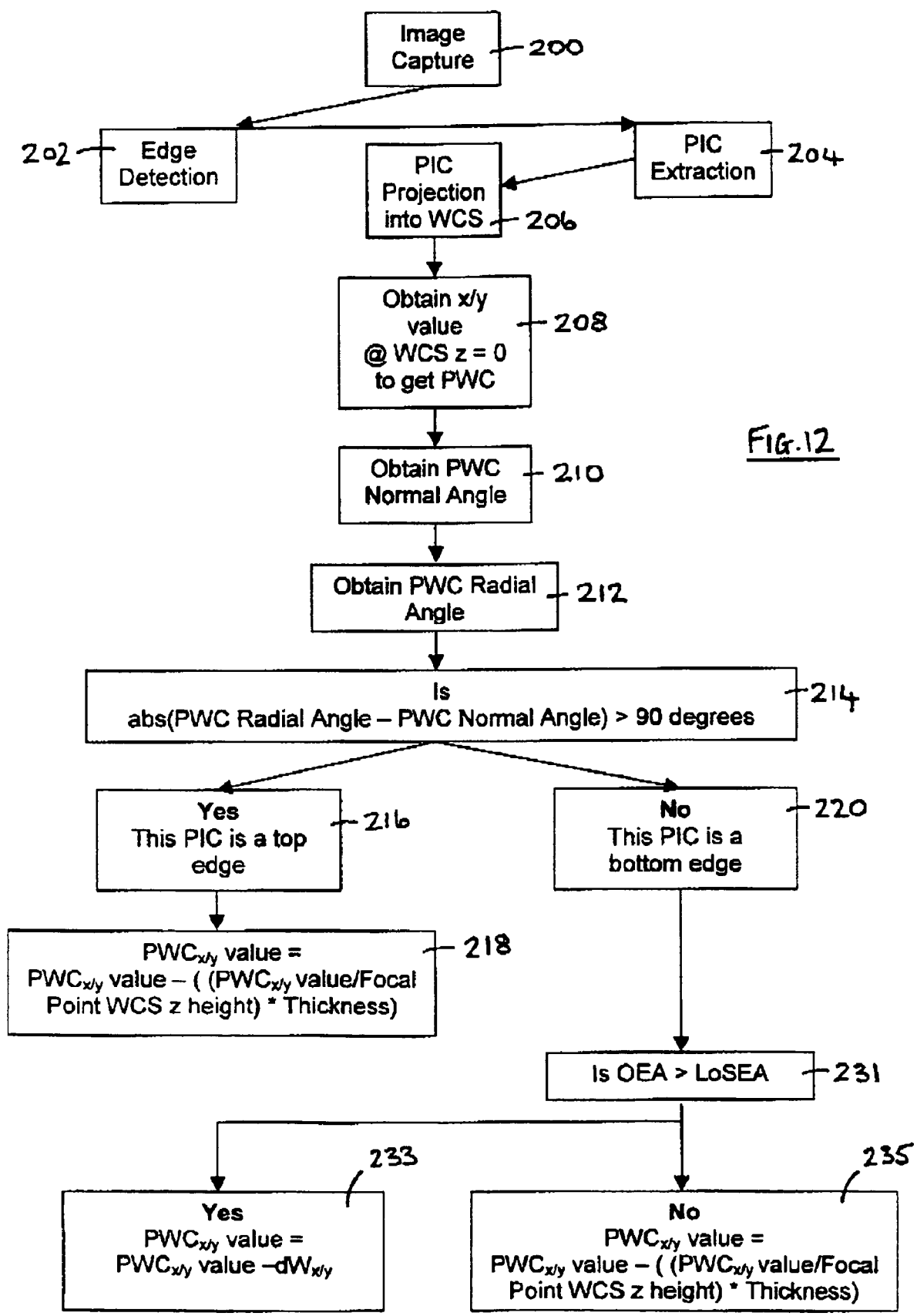
FIG. 12 is a flow chart illustrating a third example of the operation of the data processing module included in the system of FIG. 1.

FIG. 12 shows a flow chart illustrating how the flow chart of FIG. 11 may be adapted for handling an undercut edge profile. It will be noted that the algorithm illustrated in FIG. 12 is the same as the algorithm illustrated in FIG. 2 until the point where it is determined that the PIC, or OEP, is on a bottom edge (block 220). If the OEP is on a bottom edge, then the module 16 determines if the OEA is greater than the LoSEA (block 231). If so, then the initial $PWC_{x/y}$ values are adjusted by subtracting the respective $dW_{x/y}$ value (block 233). If not, then the OEP is actually determined to be an upper edge and the initial $PWC_{x/y}$ values are adjusted (block 235) using the formula:

$PWC_{x/y}$ value=$PWC_{x/y}$ value−(($PWC_{x/y}$ value/Focal Point WCS z height)*Thickness)

If the PIC, or OEP, is on an upper edge (block 216), then the initial $PWC_{x/y}$ values are adjusted (block 237) using the formula given above in relation to block 235.

It will be understood that the invention is not limited to the specific calculation techniques described herein as at least some aspects of the calculations are dependent on the selected reference system, e.g. the selected direction of the normal and the angle measuring references. Further, it is not essential that the normal from an OEP be used as a reference representing the OEP. For example, the tangent from an OEP may alternatively be used as a reference representing the OEP. Equally, any other line from an OEP may be used as a reference so long as the selected reference line is used consistently for each OEP. A skilled person will appreciate that selecting an alternative reference will affect the subsequent calculations. For example, the calculation at stage 214 of FIG. 2 may become:

Abs(Radial Angle−Reference Angle)>(90+θ)

Where "Reference Angle" is the angle made between the angle reference axle and the selected reference line, and θ is the angle between the normal and the reference line measured from the angle reference axis.

It will also be understood that the invention is not limited to the inspection of objects having right-sided, beveled or undercut edges. The data processing apparatus may be arranged to process data in accordance with a definition of any edge profile.

It will be apparent to those skilled in the art that if the optical axis 13 of the camera 12 is constrained to be substantially parallel to the z-axis, the optical axis 13 intersects the X-Y plane (z=0) at the FPx,y point and that the IEPs and OEPs will exist on substantially parallel planes, differing only in scale. If the optical axis 13 is assumed to be constrained in this way the differentiation between top and bottom edges could be made by examining the IEPs rather than the OEPs (as described hereinbefore) as this process is not effected by scale. Thus, the IEPs may be used instead of the OEPs and the optical centre of the image may be used as a reference point instead of FPx,y, the optical centre of the image being the point in the image from which the optical axis is projected. Otherwise, the determination process is generally similar to that described above in relation to OEPs. With reference, by way of example, to the flow chart of FIG. 2, determination of whether a given point is a top or bottom edge (blocks 210 to 220) may be performed prior to the projection of the IEPs (block 206). Subsequently, when the processing module 16 is deciding whether or not to adjust the OEPx/y value of a given point and therefore needs to determine whether or not the point relates to a top or a bottom edge, this information is already available to it, having been already determined from the corresponding IEP.

In the foregoing embodiments, the processing module 16 is arranged to determine whether or not each OEP lies on a top edge or a bottom edge. More generally, the processing module 16 may be arranged to determine whether or not an OEP lies on the work surface 28 (or in the object plane) or whether it lies spaced-apart from, or offset from, the work surface 28 in the Z direction (in the foregoing description, the amount of the offset corresponds to the thickness T of the object, when the OEP is on a top edge, and to zero (i.e. no offset) when the OEP is on a bottom edge. This allows the processing module 16 to handle objects whose transverse cross-sectional edge profile is such that the OEP lies between the top and bottom surfaces of the object. To this end, the processing module 16 may be arranged to determine the point at which a line of sight from the camera's focal point to the OEP meets the edge of the object. This may readily be achieved if the processing module 16 is provided with data describing the transverse cross-sectional edge profile of the object.

Figure 13:
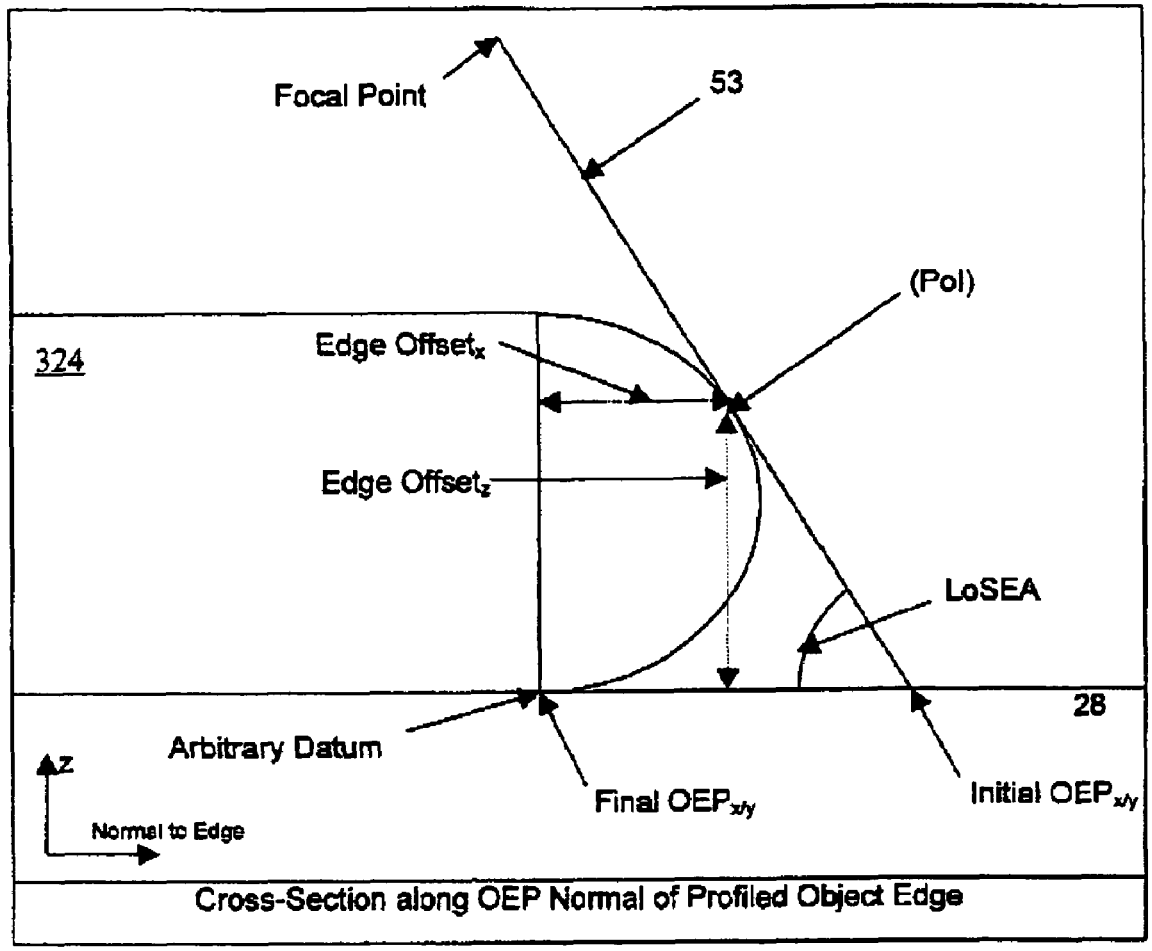
FIG. 13 presents a side sectional view of an object with a curved edge and the camera focal point.
Figure 14:
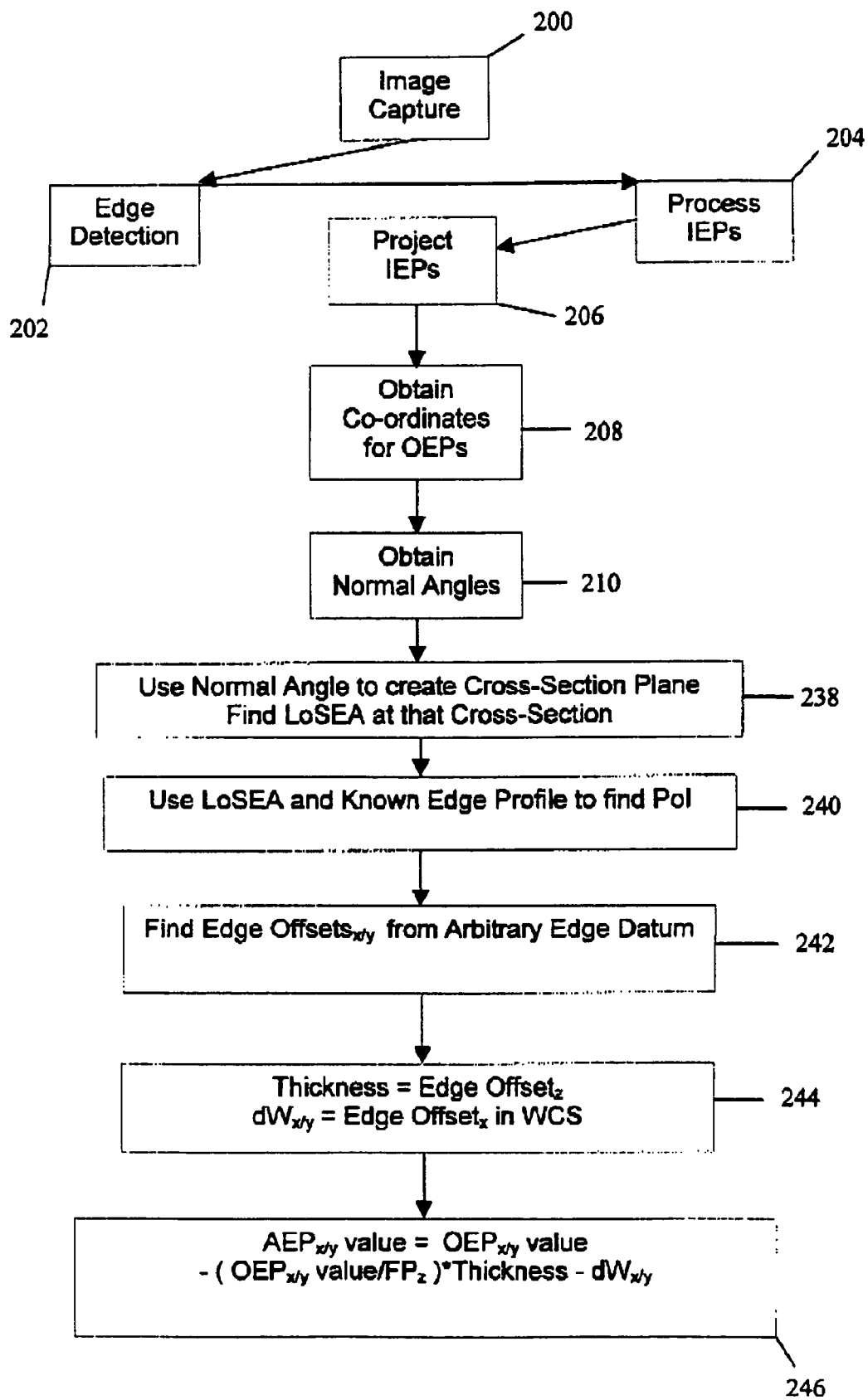
FIG. 14 is a flow chart illustrating a fourth example of the operation of the data processing module included in the system of FIG. 1.

The foregoing description of FIGS. 1 to 12 relates to the handling of objects having right-sided, beveled or undercut edge profiles. The algorithms illustrated in FIGS. 2, 11 and 12 can readily be further adapted to handle other edge profiles where the vertical offset (i.e. the offset in the Z direction) can vary along the edge profile. An example of such an object 324 is shown in FIG. 13 and a suitable algorithm is illustrated by the flowchart of FIG. 14. The flowchart of FIG. 14 is identical to those of FIGS. 2, 11 and 12, except in its determination of the vertical offset (instead of assuming this to be the thickness T) and horizontal offset, $dW_{x/y}$. Blocks 200 to 210 are identical to blocks 200 to 210 shown in FIGS. 2, 11 and 12.

In the previous algorithms (FIGS. 2, 11, 12) the identification of an edge as a top or bottom edge allowed the data processing module 16 to use the object thickness T (in case of a top edge) or zero (in case of a bottom edge) respectively as the values of the vertical offset T, and an appropriate value of $dW_{x/y}$ determined by the assessment of top or bottom edge status and knowledge of the edge profile. However this is not applicable to an edge such as the transverse cross-sectional edge profile of the object 324 shown in FIG. 13. After determination of the vertical offset T and the horizontal offset $dW_{x/y}$, has been completed, the data processing module 16 performs the equation shown in block 246 of FIG. 14. This equation is similar to the equation in blocks 218, and 222 in FIG. 2, and blocks 222, 227 and 229 in FIG. 11, and blocks 218, 233 and 235 in FIG. 12, excepting the removal of terms which equate to zero and any appropriate changes in the sign of $dW_{x/y}$ variable due to the choice of an arbitrary edge datum.

FIG. 13 shows object 324 with a curved edge profile taken at a cross-section where the X-axis of the cross-section plane is along the normal to the edge of the object (as determined by the normal angle of the OEP at issue). This is a comparable cross-section to the cross-section indicated by the line A-A' shown in FIG. 8, and the cross-sections shown in FIGS. 4, 6, 7, 9 and 10. It can be seen that the edge profile of FIG. 13 exhibits varying amounts of horizontal offset relative to an arbitrary edge Datum and varying amounts of vertical offset relative to the work surface 28.

A line of sight 53 is also shown, and is projected from the focal point to the initial $OEP_{x/y}$. This line of sight 53 when viewed in the afore-mentioned normal cross-section plane creates a line of sight angle (LoSEA) similar to that described in connection with FIGS. 9 and 10. Hence in block 238 of FIG. 14, the value of the LoSEA is determined. From block 238 it will be seen that the module 16 uses the normal angle at the OEP at issue to determine the normal cross-sectional plane in which the LoSEA is measured (and in which the cross-sectional edge profile is known). The processing module 16 is provided with data describing the cross-sectional edge profile of the object 324. The data may comprise, for example, one or more equations describing one or more lines which represent the profile, or a set of co-ordinate points in the normal cross-sectional plane. Hence, the system 10 may be used with objects having any definable edge profile.

With reference to block 240 of FIG. 14, the next value required by the data processing module 16 is the Point of Incidence (PoI). The PoI is the point where the line of sight 53 touches the edge profile of the object 324. The PoI can be obtained in a number of ways, for example, the LoSEA angle could be used to create a new co-ordinate system. This new co-ordinate system may be arranged such that its Y-axis would be parallel to the line of sight 53 and in the normal cross-section plane. The X-axis may be perpendicular to the line of sight 53 and in the normal cross-section plane. The origin of such a co-ordinate system is arranged to lie substantially apart from the edge profile of object 324 so that the y-axis of the co-ordinate system does not intersect the edge profile. When the creation and placing of this co-ordinate system has been achieved, each point on the edge profile (which are known since the processing module 16 is provided with data describing the edge profile) is examined and its absolute x-axis value in this co-ordinate system assessed. The edge profile point which possesses the smallest absolute x value, and is therefore closest to the co-ordinate system's y axis, is taken to be the PoI.

Many other techniques could be used to find the PoI such as deducing the tangents to the curve of the profile. Further techniques are given in Michael Mortenson, Computer Graphics Handbook: Geometry and Mathematics (1990).

Once the PoI has been found, the data defining the edge profile geometry may be used to find the horizontal offset (Edge Offset$_x$) relative to the arbitrary datum and the vertical offset (Edge Offset$_z$), as indicated in block 242 of FIG. 14, and illustrated in FIG. 13.

Since the Z-axis of the normal cross-section plane is parallel to the WCS Z-axis, the vertical Edge Offset$_z$ of the PoI can be used as the value for parameter T as shown in block 244 of FIG. 14. Furthermore the horizontal Edge Offset$_x$ can be converted into the WCS to provide the $dW_{x/y}$, as is also shown in block 244 (where the conversion from the co-ordinate system of the normal cross-sectional plane to the WCS depends on the value of the normal angle calculated at block 210). This $dW_{x/y}$ is comparable to the $dW_{x/y}$ described with respect to an illustrated in FIGS. 8 to 12.

The last remaining step performed by the data processing module 16 is the calculation of the actual edge point value AEP (block 246). This step involves adjusting the $OEP_{x/y}$ value by an amount depending on the calculated vertical and horizontal offsets and is identical to the equation in blocks 218 and 222 in FIG. 2, blocks 222, 227 and 229 in FIG. 11, and blocks 218, 233 and 235 in FIG. 12, excepting the removal of terms which equate to zero and any appropriate changes in the sign of $dW_{x/y}$ variable due to the choice of edge datum.

The invention is not limited to the embodiments described herein which may be modified or varied without departing from the scope of the invention.

The invention claimed is:

1. A system for inspecting an object, the system comprising a work surface providing an object plane on which, in use, the object to be inspected is located; and a camera having a focal point and a field of vision, the camera being arranged with respect to the work surface so that at least part of the work surface is within the camera's field of vision, the camera being arranged to capture an image of the object, the image comprising a plurality of image data components, the system further including an apparatus for processing the object image, the apparatus being arranged to receive image data components from a single image of the object from the camera and to generate, using said image data components of said single image, three dimensional data representing at least part of the object, and wherein in order to generate said three dimensional data the apparatus is arranged to identify a plurality of said image data components that represent the position of a respective edge component of the object in an image plane, wherein, during the capture of said single image by the camera, the camera and the object are fixed with respect to one another, the processing apparatus being arranged to project each image edge data component onto the object plane to produce a respective object edge data component in the object plane, the processing apparatus being further arranged to determine whether each object edge data component relates to a lower edge of the object that lies on the work surface or to an upper edge of the object that is offset above the work surface by an amount substantially equal to a thickness of the object at said upper edge, and wherein, only in respect of object edge data components that are determined to relate to an upper edge of the object, the processing apparatus is arranged to adjust the value of the respective object edge data component by an amount depending on the ratio of said thickness of the object at said upper edge to the perpendicular distance of the camera's focal point from the object plane, such that said object edge data components that are determined to relate to an upper edge of the object are adjusted with respect to the other object data components produced by said processing apparatus from said single image.

2. A system as claimed in claim 1, wherein when an edge profile of the object taken in a plane generally perpendicular to the object plane is generally perpendicular to the object plane, or is undercut, said object edge data components that are determined to relate to an upper edge of the object are adjusted by subtracting an amount substantially equal to said ratio multiplied by the relative distance between the object edge data component and the position of the camera's focal point in the object plane.

3. A system as claimed in claim 1, wherein when an edge profile of the object taken in a plane generally perpendicular to the object plane is beveled, the processing apparatus is arranged to determine if the angle of the beveled edge profile is greater than the angle made by a line of sight from the camera's focal point to said object edge data component and, upon so determining, to adjust said object edge data components that are determined to relate to an upper edge of the object by subtracting an amount substantially equal to said ratio multiplied by the relative distance between the object edge data component and the position of the camera's focal point in the object plane and by adding an amount substantially equal to the distance in the object plane between the edges of the beveled profile along said line of sight.

4. A system as claimed in claim 1, wherein when an edge profile of the object taken in a plane generally perpendicular to the object plane is undercut and when the processing apparatus determines that an object edge data component relates to a lower edge of the object that lies on the work surface, the processing apparatus is arranged to determine if the angle of the undercut edge profile is greater than the angle made by a line of sight from the camera's focal point to said object edge data component and, upon so determining, to adjust said object edge data component by an amount substantially equal to the distance in the object plane between the edges of the undercut profile along said line of sight.

5. A system as claimed in claim 1, wherein the processing apparatus is arranged to determine whether said object edge data components relate to a lower edge of the object that lies on the work surface or to an upper edge of the object that is offset above the work surface by an amount substantially equal to a thickness of the object at said upper edge by calculating a respective first parameter relating to a notional reference line extending from the respective object edge data component, calculating a second parameter relating to a notional line extending between the respective object edge data component and a reference point in the object plane, and comparing the difference between said first parameter and said second parameter against a threshold value.

6. A system as claimed in claim 5, wherein said first parameter comprises the value of an angle between an angle reference axis and said notional reference line extending from the respective object edge data component.

7. A system as claimed in claim 5, wherein said second parameter comprises the value of an angle between the angle reference axis and said notional reference line extending between the respective object edge data component and said reference point.

8. A system as claimed in claim 5, wherein said reference point on the object plane comprises the position of the camera's focal point in the object plane and said notional reference line extending from the respective object edge data component comprises a line normal to the object at said object edge data component, and wherein said threshold value is 90 degrees.

9. A system as claimed in claim 1, wherein the processing apparatus is arranged to calculate a line of sight from the camera's focal point to the object edge data component and to determine the point at which the line of sight substantially meets the object edge, and to determine the amount of the offset depending on the location of said point.

10. A system as claimed in claim 9, wherein the line of sight lies in a plane substantially normal to the edge of the object at the location of the object edge data component.

11. An apparatus for processing an image, the apparatus being suitable for use in a system for inspecting an object, the system comprising a work surface providing an object plane on which, in use, the object to be inspected is located; and a camera having a focal point and a field of vision arranged with respect to the work surface so that at least part of the work surface is within the camera's field of vision, the camera being arranged to capture an image of the object, the image comprising a plurality of image data components, the apparatus being arranged to receive the image data components from the camera and to generate, using image data components from a single image, three dimensional data representing at least part of the object, and wherein in order to generate said three dimensional data the apparatus is arranged to identify a plurality of said image data components that represent the position of a respective edge component of the object in an image plane, wherein the processing apparatus is arranged to project each image edge data component onto the object plane to produce a respective object edge data component in the object plane, the processing apparatus being further arranged to determine whether said object edge data components relate to a lower edge of the object that lies on the work surface or to an upper edge of the object that is offset above the work surface by calculating a respective first parameter relating to a notional reference line extending from the respective object edge data component, calculating a second parameter relating to a notional line extending between the respective object edge data component and a reference point in the object plane, and comparing the difference between said first parameter and said second parameter against a threshold value, and dependent on the outcome of said comparison, to determine that said respective object edge data component relates to a lower edge or an upper edge of said object, wherein only in respect of object edge data components that are determined to relate to an upper edge of the object, the processing apparatus is arranged to adjust the value of the object edge data component by an amount depending on the ratio of a thickness of the object at said upper edge to the perpendicular distance of the camera's focal point from the object plane such that said object edge data components that are determined to relate to an upper edge of the object are adjusted with respect to the other object data components produced by said processing apparatus from said single image.

12. A method of processing an object image in a system for inspecting an object, the system comprising a work surface providing an object plane on which, in use, the object to be inspected is located; and a camera having a focal point and a field of vision arranged with respect to the work surface so that at least part of the work surface is within the camera's field of vision, the camera being arranged to capture an image of the object, the image comprising a plurality of image data components, and wherein, during the capture of an image by the camera, the camera and the object are fixed with respect to one another, the method comprising receiving the image data components from the camera for a single image of the object; generating, using said image data components of the single image, three dimensional data representing at least part of the object; identifying a plurality of said image data components that represent the position of a respective edge component of the object in an image plane; projecting each image edge data component onto the object plane to produce a respective object edge data component in the object plane; determining whether each object edge data component relates to a lower edge of the object that lies on the work surface or to an upper edge of the object that is offset above the work surface by an amount substantially equal to a thickness of the object at said upper edge; and, only in respect of object edge data components that are determined to relate to an upper edge of the object, adjusting the value of the respective object edge data component by an amount depending on the ratio of said thickness of the object at said upper edge to the perpendicular distance of the camera's focal point from the object plane, such that said object edge data components that are determined to relate to an upper edge of the object are adjusted with respect to the other object data components produced by said processing apparatus from said single image.

13. A computer program product comprising computer usable code for causing a computer to perform the method of claim 12.

14. A system as claimed in claim 1, wherein said object is substantially planar and has a substantially constant thickness, said processing apparatus being arranged to combine said object edge data components with a data component representing said thickness in order to generate said three dimensional data representing said object.

15. A system as claimed in claim 5, wherein the processing apparatus is arranged to determine whether said object edge data points represent an interior perimeter of said object or an exterior perimeter of said object, and to arrange said object edge data points into sets in which each object edge data point in a respective set represents a common interior or exterior perimeter, and wherein the processing apparatus determines whether at least one object edge data component in each set relates to a lower edge of the object or to an upper edge of the object.

16. An apparatus as claimed in claim 11, wherein the processing apparatus is arranged to determine whether said object edge data points represent an interior perimeter of said object or an exterior perimeter of said object, and to arrange said object edge data points into sets in which each object edge data point in a respective set represents a common interior or exterior perimeter, and wherein the processing apparatus determines whether at least one object edge data component in each set relates to a lower edge of the object or to an upper edge of the object.

17. A system for inspecting an object, the system comprising a work surface providing an object plane on which, in use, the object to be inspected is located; and a camera having a focal point and a field of vision, the camera being arranged with respect to the work surface so that at least part of the work surface is within the camera's field of vision, the camera being arranged to capture an image of the object, the image comprising a plurality of image data components, the system further including an apparatus for processing the object image, the apparatus being arranged to receive image data components from a single image of the object from the camera and to generate, using said image data components of said single image, three dimensional data representing at least part of the object, and wherein in order to generate said three dimensional data the apparatus is arranged to identify a plurality of said image data components that represent the position of a respective edge component of the object in an image plane, wherein, during the capture of said single image by the camera, the camera and the object are fixed with respect to one another, the processing apparatus being arranged to project each image edge data component onto the object plane to produce a respective object edge data component in the object plane, the processing apparatus being further arranged to determine whether each object edge data component relates to a lower edge of the object that lies on the work surface or to an upper edge of the object that is offset above the work surface by calculating a respective first parameter relating to a notional reference line extending from the respective object edge data component, calculating a second parameter relating to a notional line extending between the respective object edge data component and a reference point in the object plane, and comparing the difference between said first parameter and said second parameter against a threshold value, and dependent on the outcome of said comparison, to determine that said respective object edge data component relates to a lower edge or an upper edge of said object, and wherein, only in respect of object edge data components that are determined to relate to an upper edge of the object, the processing apparatus is arranged to adjust the value of the respective object edge data component by an amount depending on the ratio of said thickness of the object at said upper edge to the perpendicular distance of the camera's focal point from the object plane, such that said object edge data components that are determined to relate to an upper edge of the object are adjusted with respect to the other object data components produced by said processing apparatus from said single image.

* * * * *